US011144983B2

(12) United States Patent
Bentubo et al.

(10) Patent No.: US 11,144,983 B2
(45) Date of Patent: Oct. 12, 2021

(54) SYSTEMS AND METHODS FOR COMPUTER GENERATED RECOMMENDATIONS WITH IMPROVED ACCURACY AND RELEVANCE

(71) Applicant: Virgin Cruises Intermediate Limited, Plantation, FL (US)

(72) Inventors: Michelle Bentubo, Orlando, FL (US); Zachary R. Merritt, Los Angeles, CA (US); Andrew Pierce Schwalb, Mt. Dora, FL (US); Francis G. Farro, II, Parkland, FL (US); Vijay Achanti, Atlanta, GA (US)

(73) Assignee: Virgin Cruises Intermediate Limited, Plantation, FL (US)

( * ) Notice: Subject to any disclaimer, the term of this patent is extended or adjusted under 35 U.S.C. 154(b) by 138 days.

(21) Appl. No.: 16/537,080

(22) Filed: Aug. 9, 2019

(65) Prior Publication Data
US 2021/0042810 A1 Feb. 11, 2021

(51) Int. Cl.
*G06Q 30/00* (2012.01)
*G06Q 30/06* (2012.01)
*G06N 20/00* (2019.01)

(52) U.S. Cl.
CPC ......... *G06Q 30/0631* (2013.01); *G06N 20/00* (2019.01); *G06Q 30/06* (2013.01); *G06Q 30/0601* (2013.01)

(58) Field of Classification Search
CPC .............. G06Q 30/0601–0645; G06Q 30/08
(Continued)

(56) References Cited

U.S. PATENT DOCUMENTS

2008/0215607 A1* 9/2008 Kaushansky ....... G06F 16/9535
2010/0198834 A1 8/2010 Petras
(Continued)

FOREIGN PATENT DOCUMENTS

EP 2728535 A1 5/2014
WO 2013013091 A1 1/2013

OTHER PUBLICATIONS

Kelley, Jason, "We're in the Uncanny Valley of Targeted Advertising", Apr. 20, 2018, eff.org, accessed at [https://www.eff.org/deeplinks/2018/04/were-uncanny-valley-targeted-advertising] (Year: 2018).*
"Collaborative Filtering", Wikipedia, Jun. 29, 2018, 11 pages, https://en.wikipedia.org/wiki/Collaborative_filtering.
"Recommender System", Wikipedia, Jul. 4, 2018, 18 pages, https://en.wikipedia.org/wiki/Recommender_system#Content-base . . . .
(Continued)

*Primary Examiner* — Jeffrey A. Smith
*Assistant Examiner* — Lindsey B Smith
(74) *Attorney, Agent, or Firm* — Lempia Summerfield Katz LLC

(57) ABSTRACT

The disclosed embodiments relate to a computer implemented recommender system/method which enables the computer to provide more "emotionally" relevant/connected, and therefore more likely to be successful, recommendations while minimizing dependency on historical data as well susceptibility to bias, e.g. monetary and/or sponsor based. The disclosed embodiments segment a target set of known users into groups based on similar characteristics and then associate each group with one or more unique sets of affinities derived from the social media interactions of a general population having similar affinities. Similarly, a unique set of affinity characteristics is derived, and stored in a data structure, for each of a set of recommendations. The unique sets of affinities associated with the groups are compared with the set of affinity characteristics associated with each recommendations to derive a subset thereof relevant to the users of the particular group.

25 Claims, 5 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 2011/0040655 A1 | 2/2011 | Hendrickson | |
| 2012/0143693 A1 | 6/2012 | Chung | |
| 2013/0066716 A1 | 3/2013 | Chen | |
| 2013/0085805 A1 | 4/2013 | Kursar | |
| 2013/0124298 A1* | 5/2013 | Li | G06Q 30/0241 705/14.42 |
| 2014/0180788 A1 | 6/2014 | George | |
| 2015/0142510 A1 | 5/2015 | Bodden | |
| 2016/0086232 A1 | 3/2016 | French | |
| 2016/0140627 A1 | 5/2016 | Moreau | |
| 2016/0321243 A1 | 11/2016 | Walia | |
| 2017/0091816 A1 | 3/2017 | Moreau | |
| 2017/0116277 A1* | 4/2017 | Cameron | G06F 16/9538 |
| 2018/0182381 A1 | 6/2018 | Singh | |
| 2018/0315094 A1 | 11/2018 | Ashoori | |
| 2019/0236679 A1 | 8/2019 | Kumar | |

OTHER PUBLICATIONS

"Tag Cloud", Wikipedia, Jul. 7, 2018, 7 pages, https://en.wikipedia.org/wiki/Tag_cloud.
"Twitter Data + Hospitality", Avero Case Study, 2 pages.
Asher Feldman, "How NLP Systems Enable Personalization", Centric Digital, Jun. 13, 2017, 7 pages.
Bernard Marr, "AI on Cruise Ships: The Fascinating Ways Royal Caribbean Uses Facial Recognition and Machine Vision", LinkedIn, May 19, 2019, https://www.linkedin.com/pulse/ai-cruise-ships-fascinating-ways-royal-caribbean-uses-bernard-marr, 6 pages.
Paige Leidig, "How Social Media Listening Complements Demographic Targeting", Netbase, Feb. 17, 2016, https://www.netbase.com/blog/social-media-listening-complements-demographic/, 7 pages.
Sajjad Husain et al., "Relevance of Social Media in Marketing and Advertising", Splint International Journal, Jul. 2016, 16 pages, vol. 3, Issue No. 7.
Sun et al., "Tourists Traits Analysis on Social Networks", Proceedings of the 6th International Conference on Tourism (ICOT) 2016, 12 pages.
International Search Report and Written Opinion, from PCT/US2020/040280, dated Sep. 16, 2020.

* cited by examiner

SYSTEMS AND METHODS FOR COMPUTER GENERATED RECOMMENDATIONS WITH IMPROVED ACCURACY AND RELEVANCE

BACKGROUND

A recommender or recommendation system, platform or engine is a type of computer-based information/data processing system, primarily used in commercial applications, that seeks to automatically predict the "rating" or "preference" a user/consumer, or group of similar users/consumers, would give to an item, e.g. a commercial service, activity, experience, or product, or otherwise anticipate a need, desire or propensity therefore. In some cases, once a preference, anticipated need, desire or propensity is determined, the system further automatically causes the service, activity, experience or product, or an offer therefore, to be provided, made available or otherwise advertised, e.g. information related thereto communicated, to the intended/targeted user(s)/consumer(s) or group thereof.

These systems are utilized in a variety of areas, and may be most commonly recognized as playlist generators for video and music services, product/service recommenders for service/product vendors, or content recommenders for social media platforms. These systems can operate using a single input, like music, or multiple inputs within and across platforms like news, books, and search queries. There are also popular recommender systems for specific topics like restaurants and online dating. Recommender systems may be used in the travel industry to provide travel product/service recommendations, e.g. recommended destinations, modes of travel, amenities, activities, etc., as well as improve the customer experience while traveling, e.g. to provide recommended products/services/activities while travelling. For example, recommender systems may be used on board a cruise ship to make personalized recommendations designed to make passengers more comfortable or help them make the most of their time, e.g. by helping them take advantage of available services, amenities, experiences, activities, etc.

Recommender systems may make use of either or both collaborative filtering and content-based filtering (also known as the personality-based approach), as well as other systems such as knowledge-based systems. Collaborative filtering approaches build a model from a user's past behavior (items previously purchased or selected and/or numerical ratings given to those items) as well as similar decisions made by other users. This model is then used to predict items (or ratings for items) that the user may have an interest in. Collaborative filtering is based on the assumption that people who agreed in the past will agree in the future, and that they will like similar kinds of items as they liked in the past. The system generates recommendations using only information about rating profiles for different users or items. By locating peer users/items with a rating history similar to the current user or item, they generate recommendations using this neighborhood. A key advantage of the collaborative filtering approach is that it does not rely on machine analyzable content and therefore it is capable of accurately recommending complex items such as movies without requiring an "understanding" of the item itself.

Collaborative filtering approaches often suffer from three problems: cold start, scalability, and sparsity. Cold start: These systems often require a large amount of existing data on a user in order to make accurate recommendations. Scalability: In many of the environments in which these systems make recommendations, there are millions of users and products. Thus, a large amount of computation power is often necessary to calculate recommendations. Sparsity: The number of items sold on major e-commerce sites is extremely large. The most active users will only have rated a small subset of the overall database. Thus, even the most popular items may have very few ratings.

One example of collaborative filtering is the item-to-item collaborative filtering (people who buy x also buy y), an algorithm popularized by Amazon.com's® recommender system. Many social networks originally used collaborative filtering to recommend new friends, groups, and other social connections by examining the network of connections between a user and their friends.

A different type of collaborative filtering, similar to Amazon's® customer "Who Bought" feature, is described in U.S. Pat. No. 6,041,311. This method of filtering is stored into the "memory" of user profiles. The item is stored with the user's rating of the item. When a similar item becomes available, the user is presented with an offer. Users can be grouped, then, into clusters based on the plurality of his/her selections. It may be desirable to use a similar method to gather customer data whereby the customer may choose what items he/she values as "popular" and may modify his/her "popular" picks over time. However, it may also be desirable that each user further have the ability to set who they may be grouped with and what vendors he/she would like to receive offers from within the "network." In other words, it may be desirable that the grouping be specific to the item(s) or category of item(s) from any number of vendors in any area of business, restaurant, retail, travel, hospitality, and/or entertainment, within the "network." Also, if a user wishes to travel to a new destination, based on the user's restaurant, retail, travel, hospitality, and entertainment preferences in his/her profile, the user may wish to receive package offers that he/she may also like. Moreover, it may be desirable for a package offer to include types of restaurants, retail, travel, hospitality, entertainment, and a combination thereof that are customized to the user's specific preference choices and previous purchase history. Although the offers may be made by grouping choices of previous preferences and purchases, the offers may be customized based on the user's profile information.

Content-based filtering approaches utilize a series of discrete, pre-tagged characteristics of an item in order to recommend additional items with similar properties. Content-based filtering methods are based on a description of the item and a profile of the user's preferences. These methods may be best suited to situations where there is known data on an item (name, location, description, etc.), but not on the user. Content-based recommenders treat recommendation as a user-specific classification problem and learn a classifier for the user's likes and dislikes based on product features.

In this system, keywords are used to describe the items and a user profile is built to indicate the type of item this user likes. In other words, these algorithms try to recommend items that are similar to those that a user liked in the past, or is examining in the present. It may not rely on a user sign-in mechanism to generate this often temporary profile. In particular, various candidate items are compared with items previously rated by the user and the best-matching items are recommended. This approach has its roots in information retrieval and information filtering research.

One issue with content-based filtering is whether the system is able to learn user preferences from users' actions regarding one content source and use them across other content types. When the system is limited to recommending content of the same type as the user is already using, the value from the recommendation system is significantly less than when other content types from other services can be recommended. For example, recommending news articles based on browsing of news is useful, but would be much more useful when music, videos, products, discussions etc. from different services can be recommended based on news browsing.

Each type of system has its strengths and weaknesses. Systems based on collaborative filtering require a large amount of information about a user to make accurate recommendations. This is an example of the cold start problem, and is common in collaborative filtering systems. Whereas, while a system based on content-based filtering need very little information to start, such a system is far more limited in scope (for example, it can only make recommendations that are similar to the original seed).

Current recommender systems typically combine one or more approaches into a hybrid system. Hybrid approaches can be implemented in several ways: by making content-based and collaborative-based predictions separately and then combining them; by adding content-based capabilities to a collaborative-based approach (and vice versa); or by unifying the approaches into one model. These methods can also be used to overcome some of the common problems in recommender systems such as cold start and the sparsity problem. Some hybridization techniques include: Weighted: Combining the score of different recommendation components numerically; Switching: Choosing among recommendation components and applying the selected one; Mixed: Recommendations from different recommenders are presented together to give the recommendation; Feature Combination: Features derived from different knowledge sources are combined together and given to a single recommendation algorithm; Feature Augmentation: Computing a feature or set of features, which is then part of the input to the next technique; Cascade: Recommenders are given strict priority, with the lower priority ones breaking ties in the scoring of the higher ones; and Meta-level: One recommendation technique is applied and produces some sort of model, which is then the input used by the next technique.

Recommendations systems may further factor in one or more demographic attributes of user/consumer, or group to which they belong, such as age, gender, location, etc., into the generation of recommendations.

Recommender systems are a useful alternative to search algorithms since they help users discover items, e.g. previously unknown or unsolicited items, they might not have found/solicited otherwise and are often implemented using search engines indexing non-traditional data.

However, most recommendation systems essentially speculate as to a user/consumer's preferences.

Performance of a recommendation system may be measured using various metrics such as accuracy, diversity, coverage, relevancy, serendipity, and/or novelty. Accuracy is a measure of the recommendation system's ability to predict those items/services that a user/consumer has already purchased, rated or interacted with. Diversity measures how dissimilar, e.g. as to content or ratings, the recommended items/services are for a user. Coverage represents the percentage of things (items, services, users, or ratings) that the recommendation system was able to recommend. Relevancy measures how relevant the recommendations are. Serendipity is the measure of how surprising the successful or relevant recommendations are. Novelty determines how unknown or generally surprising the recommended items are to a user/consumer.

Various methods of improving recommendation systems have been implemented. For example, natural language processing ("NLP") techniques have been deployed to dissect and discern intent from human conversations and natural language message exchanges. NLP is a set of artificial intelligence processes that can crunch human conversational language, yielding a precise understanding of what is being communicated. In turn, this information can then be used to refine an understanding of a user's preferences to provide more closely aligned recommendations.

Given the widespread availability and usage of social networks by consumers, many businesses have become interested in being able to effectively market their products through various social networking mediums. Accordingly, some systems allow businesses and enterprise business applications to interact with and take action upon data that originate from online sources of social data and commentary. For example, consider a CRM (Customer Relationship Management) application, which is designed to facilitate the ability of a business to create, develop, and build relationships with its customers or potential customers. Some systems allow the business CRM application to stay informed of actionable social networking content, for example, to identify potential customers and possible sales leads. Further, in some cases brand managers are often interested in monitoring commentary on the internet regarding their brands or competitors' brands. Brand managers may read the commentary to gauge interest in their marketing materials, receive feedback regarding their products, or take further action regarding any inflammatory postings. Some systems may construct effective marketing campaigns based upon data from analysis of social media sources, and to also utilize those same social media venues as part of the marketing campaign. For example, some systems may implement an integrated solution for real-time social marketing. The approach allows a business entity to access and integrate with social media data, where data is accessed from across multiple types of internet-based sources of social data and commentary and to perform semantic analysis upon that data. The results of that analysis are used to take actions to construct and implement a social media marketing campaign. In some embodiments, the integrated system may be cloud-based, and include both a social monitor/analysis service as well as a social marketing/CRM application.

Other systems include performing analysis of content or social media data provided or posted by identified sets or groups (e.g., "tribes") of online authors or contributors of content in social media such as blogs, online forums, messaging services, web sites, and the like. The tribes are identified from a given/previously identified population of interest based on one or more selection characteristics/criteria (e.g., their age, gender, political beliefs, hobbies, and the like) derived from the members thereof, and social media data (such as blog entries and the like) contributed or posted by the members is collected and then analyzed to identify common interests which may be used to group subsets of members of the population into tribes. Further, analysis of the tribe's data may be performed to gain additional intelligence (such as their likes and dislikes, their brand loyalty, their political leanings, and so on). The tribe analysis provides entities such as businesses, political organizations, governments, and more the ability to discover the common interests of people who share a common characteristic(s) and/or interest(s). In the past, gathering such data would have been difficult, but such systems may recognize that the recent robust contribution by individuals to social media such as blogs provides an amount and detail of publicly available information that is useful for determining common interests amongst groups of these online authors. The data is typically unstructured by the generation of tribes to aggregate select portions of the data when combined with analysis methods allows the common interests of the tribes to be determined.

Companies in the restaurant, retail, travel, hospitality, and entertainment industries are constantly seeking new promotions for attracting new customers, moving them through the purchasing process more efficiently, increasing revenues, and improving customer loyalty. Additionally, these entities also constantly seek new ways to improve customer retention by obtaining more precise data about their customers' preferences that may be used to target market those customers. In recent years, technology has been used to implement new ways to attract customers and to create store-specific customer profiles and the like for purposes of improving targeted marketing. The Internet has facilitated such efforts by enabling data management of the collected customer information.

However, targeted marketing efforts to date have been relatively ineffective as they group, score, and mine the customer data but do not effectively reach each customer at the appropriate time and place, instead using broad advertising calls, mailers, e-mails, surveys, and other methods of contacting the customer with general marketing campaigns. In short, the methods to date have not enabled vendors to gather the depth of information that they need in order to specifically tailor offers to meet each customer's needs while accounting for the customer's specific preferences. Better knowledge of the customer's specific purchasing and profile preference information will allow vendors to send precision offers to customers based on real-time purchasing and profile preference data of that customer. Moreover, an approach is needed whereby the precision offers reach the customers at the appropriate time (e.g., when the customers are in the proximity of the vendor's location) in the way that the customer prefers to receive such offers.

DETAILED DESCRIPTION

Figure 1:
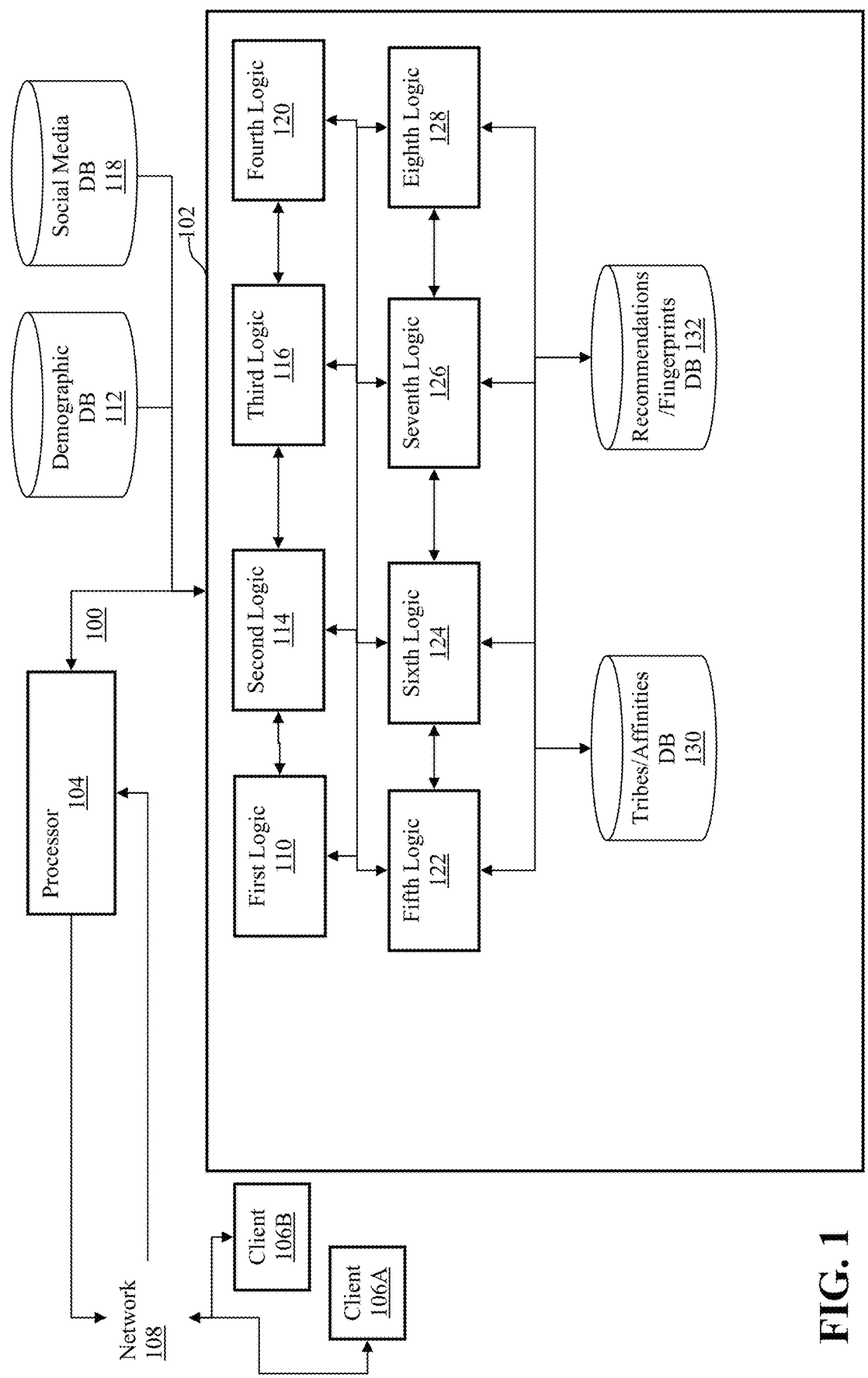
FIG. 1 depicts a block diagram of a recommendation system according to one embodiment.

The disclosed embodiments generally relate to a computer implemented recommender system/method which enables the computer to provide more "emotionally" relevant/connected, and therefore more likely to be successful, recommendations while minimizing the system's dependency on historical data as well as the system's susceptibility to bias, e.g. monetary and/or on the part of a particular entity or source, such as the recommendation sponsor. The disclosed embodiments implement a practical application which segments a target set of known users into pre-externally-defined groups, e.g. previously defined tribes and/or sub-tribes, based on similar characteristics, e.g. demographics and/or particular affinities, among subsets of the target set of users. The system then further associates each group of users with one or more unique sets of affinities derived from the social media interactions of a separately identified general population having similar affinities and enhanced via post processing to further derive and expand upon subjective and objective concepts, and user associations/engagement therewith, indicated by those interactions, which describe the affinities of subsets of the general population. Similarly, a unique set of affinity characteristics is derived, and stored in a data structure, for each of a set of recommendations based on a narrative describing the recommendation and subsequent processing thereof to extract and expand subjective affinity-related concepts embodied therein. The unique sets of affinities associated with the groups of users are stored in data structures in association with their respective group(s) and are compared with the set of affinity characteristics associated with each recommendations to derive a subset thereof relevant to the users of the particular group.

As discussed above, collaborative filtering combines a user's past behavior with similar decisions made by other users to predict future interest and essentially assumes that assumes people who agreed in the past will agree in the future. Content-based filtering uses discrete characteristics of an item, possibly in concert with user preferences (likes/dislikes), to recommend other items with similar characteristics (that meet the user preferences). Hybrid recommender systems use a combination of these systems.

The disclosed embodiments go beyond collaborative and/or content based systems to enable, or otherwise implement a practical application which enables, the computer to function in a manner it otherwise would be unable to, i.e., to infer how a target user may "feel" about a particular recommendation and thereby provide more emotionally connected/relevant recommendations. For example, as opposed to merely determining that a particular user will likely like a particular product because other similar users also liked that product or because the user liked similar products, the disclosed embodiments are able to infer that the user will like the particular product based on their preference, positive or negative, for, and/or engagement with, a different product regardless of the attributes thereof. In particular, the system enables a computer to subjectively relate products/brands together, e.g. a known product/brand of interest to a recommended product/brand while avoiding both sponsor and monetization bias. It will be appreciated that the disclosed embodiments may be used in conjunction with collaborative and/or content based recommendation techniques or otherwise with additional filtering mechanisms as will be described.

Furthermore, the disclosed embodiments pre-define how a set of target users will be subdivided, e.g. into tribes and/or sub-tribes, i.e. the subdivisions (tribes/sub-tribes) are defined first and then the set of target users assigned thereto/subdivided there among, as described herein, as opposed to merely sub-dividing a set of target users based on one or common characteristics therein. By pre-defining the subdivisions, broader commonalties among subsets of target users may be identified, i.e. classification bias based on constrained inputs limited to only those characteristics identified in the target users themselves may be avoided. In addition, the disclosed embodiments derive the subjective relationships between known products/brands and recommended products/brands using a generalized population as opposed to using the target set of users. Again, using a separate generalized population avoids constraining the inputs to only those affinities of the users for which the system is trying to provide recommendations which may restrict such recommendations to a closed or more limited universe.

While the disclosed embodiments will be described with respect to their deployment in the cruise/hospitality industry, e.g. to provide pre-voyage recommendations such as cruise type, destination, etc., in-voyage recommendations such as in-voyage activities, experiences, etc. and post-voyage recommendations such as where to take a cruise to next, it will be appreciated that the disclosed embodiments may be deployed in any environment to provide recommendations relevant thereto. The recommendation system may be operated by a vendor of products/service, e.g. a cruise vacation provider, or operated by a third party, such as a marketing entity, which provides recommendations services thereto. While the disclosed embodiments will be described with respect to a vendor-operated system, it will be appreciated that they are applicable to a third party operated/vendor-subscribed-to system as well.

Figure 5:
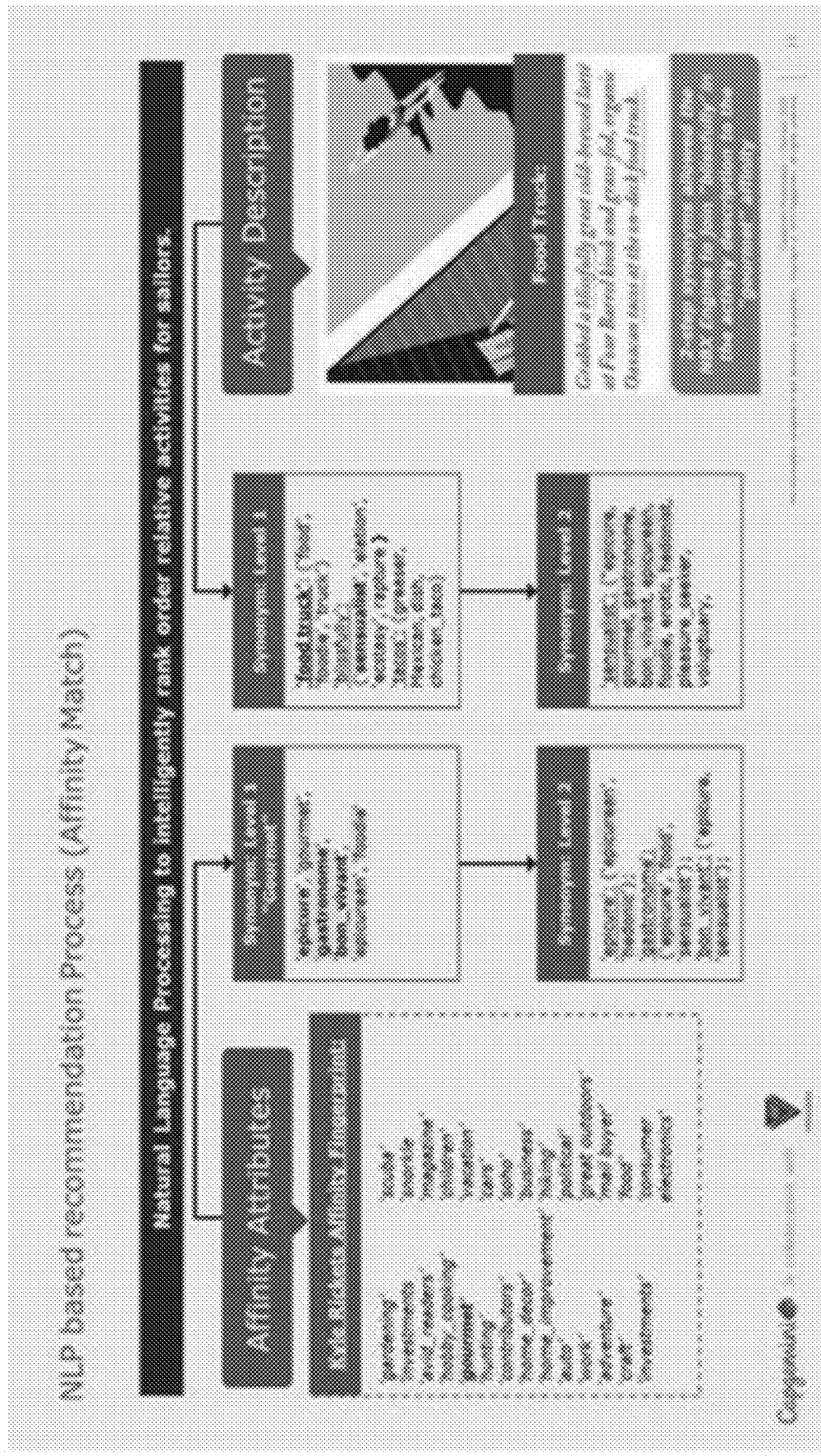
FIG. 5 shows a diagram of exemplary operation of the system of FIG. 1.

Generally, as depicted in FIG. 5, the disclosed embodiments establish a target set of users to which any of a set of recommendations are to be provided. Those users are subdivided into pre-defined groups, referred to as tribes or sub-tribes, based on a combination of demographic and other user level/specific data regarding each user. The affinities, e.g. things the group members may naturally like, have an interest in, sympathize or connect with, or be attracted or partial to, of each tribe/sub-tribe are derived from a separately defined user population using a social media extraction process in combination with natural language processing, described in more detail below. Similarly, an affinity construct is derived for each recommendation in the set of recommendations by extracting descriptive content from a narrative description of the recommendation and further applying natural language processing, as will be described in more detail below. This affinity construct, which may take the form of a set of "tags" or a tag cloud, weighted or otherwise, may include one or more affinity characteristic, i.e. characteristics or attributes of the underlying recommended product/service which describe how it may be referred to, liked by, or otherwise found interesting or attractive to someone. For each tribe-sub-tribe, the derived affinities are compared against the affinity constructs of each of the recommendations and the degree to which they match or overlap is determined. A rank ordered set of recommendations for each tribe/sub-tribe may then be generated based on the determined degree of overlap with some, e.g. the top 2, or all of the recommendations then being provided to the associated tribe/sub-tribe.

An example rank ordered list may include:
1. Oaxacan Dinner
2. Hot Stone Spa Treatment
3. St. Abby Tour
4. Bumper cars
5. Private Island Tour
6. Fine Champagne Tasting
7. Jazz Bar—Featuring Regina Carter
8. Lecture—Why women and men think differently
9. Lunch—Lido Bistro
10. Dancing—Ball Room/Adult
11. Snorkeling
12. Swedish Spa Treatment
13. Pool Party—Adults
14. Lecture—How to negotiate anything It will be appreciated that a group or set of users may be divided or segmented into one or more overlapping, e.g. hierarchical or otherwise, or non-overlapping sub-groups, subsets or segments, which themselves, or further divisions thereof, may be referred to as sets, subsets, groups, subgroups, segments, sub-segments, tribes or sub-tribes. As used herein, sub-groups/subsets into which target users are divided may be referred to as tribes or sub-tribes, regardless of how those groups/subsets are defined, and it will be understood that the use of such nomenclature is implementation dependent and that the disclosed embodiments are applicable to any scheme by which a group/set of users may be sub-divided into sub-groups/subsets thereof, overlapping and/or otherwise at least partially hierarchically arranged, or not, regardless of how the groups or sub-groups are arranged, organized, identified, classified or characterized. In one embodiment, users grouped in to the same tribe or sub-tribe will be ascribed a common set of affinities and, based on the operation of the disclosed embodiments, may receive one or more of the same recommendations. As noted, a target user may be a member of more than one tribe or sub-tribe and a member of a particular tribe may or more may not be a member of a particular sub-tribe thereof. By virtue of being members of different tribes/sub-tribes, a given target user may receive a unique or otherwise tailored, actual or as perceived by the target user, set of recommendations as compared with other target users. Furthermore, the particular tribe/sub-tribe arrangement permits the disclosed embodiments to control the granularity with, and degree to, which sets of recommendations provided to particular target users are similar, allowing the disclosed system to control the perception of a tailored/bespoke experience by each target user as well as the degree to which the set of recommendations aligns with the preferences and expectations thereof.

Herein, recommendations generated by the disclosed embodiments may be provided to the particular target users either directly or indirectly. In particular, recommendations may be provided directly via electronic communications, such as via email, text message, instant message, on-screen/in-app notification, audible notification, facsimile, etc. conveyed to the user via a user owned/carried/accessible or otherwise personal device such as a wired and/or wireless mobile device, telephone, facsimile device, television or personal computer, or via publicly accessible communications systems, such as publicly viewable electronic signage or a public address system. It will be appreciated that recommendations may also be communicated via written/physical communications, e.g. printed and mailed/delivered correspondence such as a mailed letter/post-card or cabin-delivered communication. Alternatively, or in addition thereto, recommendations may be indirectly provided to a target user via an agent or intermediary, such as an employee/associate of an entity deploying or using the recommendation system, e.g. a telemarketing agent or ship crew member who receives, via their computer or personal mobile device, notification of the recommendation for the user and direction, or other prompt, to deliver it thereto, either orally, in writing or other manner, e.g. actual provision or offer of the recommended product or service. Furthermore, recommendations may be provided on an unsolicited basis, e.g. pushed to the user without having been requested, and/or on a solicited basis, e.g. pulled or upon request.

A recommendation may include a specific message, directive, offer, suggestion or other content related to a one or more of a service, adjunct service, product, activity, experience, etc., which may be for sale or otherwise available, or a list, e.g. a rank ordered list, thereof. It will be appreciated that the recommendation may take the form of the actual recommended product or service, e.g. a crew member may present the target user with a recommended cocktail as an offer, complementary or otherwise. Recommendations may include special/ethnic/exotic meals, spa treatments, cocktails, tours, excursions, educational lectures, sports, entertainment or leisure activities, etc. As described elsewhere, the system may provide a specific recommendation or an ordered, e.g. rank ordered, list of recommendations.

In one embodiment, a system and method is provided for use by a cruise provider for segregating/segmenting (subset segmentation) a target population of users into one or more (overlapping/non-overlapping) subsets ("tribes") for the purpose of directing targeted (tribe relevant) messages pre-, during and/or post-voyage. The messages may include offers/recommendations, and other marketing communications, and may be hospitality focused, e.g., on products, services, activities, experiences, etc. The system may provide these messages on demand (pull) or based on trigger event (push), so as to, for example, facilitate discovery of products/services and minimize a user's/passenger's effort, e.g. need to seek out/search for products/services.

In one embodiment, the system may further factor in geographic/physical proximity to further refine which messages/recommendations are provided based on the location, actual or projected path of travel, or intended destination of the target user, e.g. provide messaging related to drink/cocktail offers when the target user is headed in the direction or otherwise located proximate to the bar, spa treatments when the user is near the spa, meal recommendations when the user is near or headed in the direction of the restaurant. It will be appreciated that the system may know the target user's location by using facial or other biometric recognition at various defined waypoints, provisioning the user with a trackable device, such as an RFID enabled wristband or GPS transponder, based on monitoring of a user's personal device such as via the use of GPS or WiFi tracking or beacons (e.g. using NFC or Bluetooth), or otherwise requiring a user to "check in" at various locations by entering identifying information into a terminal, scan a barcode or NFC enabled badge, etc. In addition, or alternatively thereto, target user locations may be indirectly obtained via agents, e.g. via reports from crew members, or inferred based on time of day, day of week, holidays, current weather conditions, or other information known to the system, such as a user's or the ship's position or activity schedule.

In one embodiment, the system may further factor in temporal attributes to further refine which messages are provided based on, or otherwise coordinated with, current time/day or user availability, e.g. provide messaging relating to a time-based activity only in advance or at that time, or when, based on the user's availability, is consistent with the timing/availability of the activity. For example, a sun-rise excursion may only be recommended the night before or a spa treatment may only be recommended when an available appointment coincides with the availability of the target user. In one embodiment, the system may have access to a user's electronic calendar or schedule.

In one embodiment, prior to the segregation of subsets of target users into tribes and/or sub-tribes, the one or more tribes and/or sub-tribes are defined. In particular, tribes and/or subtribes may be defined based on market research, surveys, e.g. via email, focus groups with potential customers, and/or strategic planning/analysis conducted by the operator of the disclosed recommender system. Using these processes, the operator may identify different segments of hypothetical customers and associated hypothetical psychographic profiles thereof, which define hypothetical demographics and affinities, e.g. for hobbies, lifestyles, brands, artists, places, websites, TV shows, and movies, which align with the operator's products and/or business goals and predicted/assumed customer base. By pre-defining the tribes/sub-tribes independent of the actual set of target users, the disclosed embodiments avoid a closed/self-limiting clustered approach whereby the scope of recommendations that may be provided are constrained by the affinities of the target users which, for example, would restrict discovery of new products, experiences, etc. which may be desired by the target users. It will be appreciated that the pre-defined tribes and/or subtribes are not static and may be dynamically redefined and/or restructured via, for example, an automated and/or manual feedback and/or continuous improvement process. For example, the operator of the disclosed system may periodically conduct additional market research, surveys, etc., with current target users, e.g. customers, as well as others, including internal business stakeholders. These processes may evaluate the actual segmented target user set to ensure that, for example, given tribe/sub-tribe definitions provide sufficient distinction between target users, granularity to ensure at least a perceived unique/tailored experience, and/or that no defined tribes/sub-tribes are under-utilized/under-represented or unused, etc. The result of this analysis may prompt an automated or manual reshuffling, such as in real-time with the operation of the disclosed system, of tribe/sub-tribe membership, including addition of new tribes and/or sub-tribes, coalescing of two or more tribes and/or sub-tribes into fewer tribes or sub-tribes, removal of a tribe or sub-tribes, etc., and resultant reshuffling of tribe/sub-tribe membership, with the recommender system continuing to operate, e.g. provide recommendations, based on the evolving tribe/sub-tribe structure as described. This may create a self-evolving system by which the system learns and improves the accuracy of its recommendations over time, etc. In one embodiment, statistical process control may be implemented to measure the results of recommendations, e.g. measure target user satisfaction therewith, and feedback modifications to the tribe/sub-tribe redefinition process so as to maintain or modify, for example, a statistically determined measure of recommended satisfaction.

In one embodiment, subset segregation is the process used to sub-divide a target set of known users into the pre-defined one or more tribes and/or sub-tribes. The process of subset segregation may be performed in batch or as a continuous, e.g. real time, process, and, as will be described, may incorporate a data model and/or artificial intelligence/machine learning. The members of the target set of users may be derived from "hand raisers", e.g. those who have solicited, registered, subscribed, expressed interest in, or otherwise identified themselves, to purchase, test, try or obtain additional information about, the products and/or services of the vendor operating/deploying the recommender system, e.g. the various cruise offerings, and activities aboard, of the cruise vacation vendor. These members may include those who have "followed" or "liked" the cruise line in social media, or otherwise subscribed to information or expressed an interest, those who have registered, enrolled, placed a deposit on or otherwise purchased an upcoming cruise vacation, or who have previously purchased. In particular, target users are those who have identified themselves to the recommender system and are explicitly or implicitly amenable to receiving recommendations therefrom.

Subset segregation utilizes demographic data for each target user which includes non-anonymized attributes of each user, such as geographical attributes (zip code of residence), age (specific or range), marital status, income rage, occupation, children/no children/number of children/ age of children/gender of children, hobbies, travel preferences, travel activity preferences, brands they likely follow, preferred brands, etc. For example, demographic data may include:

Individual Demographics: Age, gender, ethnicity, education, occupation

Household Characteristics: Household size, number/ages of children

Financial: Income ranges, net worth, economic stability

Life Events: Marriage/divorce, birth of children, home purchase, moves

Interests: Sports, leisure activities, family, pets, entertainment

Buying Activities: Products bought, method of payment

Behavior: Community involvement, causes, gaming

Major Purchases: Travel, automotive, real property, technology

Other Affinities: Brands, artists, Facebook groups, TV shows

Demographic data may be obtained from third party data sources/marketing data aggregators, such as Axciom LLC, and may further include purchase history data, web browsing history data, etc. Generally, such data allows the system to know "who" each target user is. In addition, other data may be collected for each target user, e.g. in bulk or on an on-going basis, including data collected from focus group participation, digital interaction, such as interactions with digital advertisements, and interactions directly with the vendor operating the recommendation system, e.g. clickstream data based on interactions with the vendor website/web-content or mobile app, call center data based on interactions with a vendor's call center, responses to marketing promotions/inquiries, etc. In addition, their social media data, e.g. posts, likes, tweets, follows, etc., may be collected. For those target users that are current or former customers of the vendor, their prior activities may be used as well, such as prior ship-board activities, results of crew contact/interactions (documented by a crew member or based on activities undertaken subsequent to a crew interaction, such as a satisfaction survey), etc.

Using this gathered data, target users may be divided into one or more tribes and/or subtribes based on one or more common attributes. For example, the target users may be divided by age, marital status, brand preference, etc. As noted above, a given target user may be a member of one or more tribes/sub-tribes. Alternatively, or in addition thereto, tribes/sub-tribes may be defined based on non-traditional delineations, such as explorer, revel, bask, luxuriate, mystery, adventure, quirk, cool, party, glamorous, chill, insider, augmented, etc. where each is delineated by particular characteristics of the target users gleaned from the gathered demographic and other data noted above. When applied on a continuous basis, or whenever the segmentation process is repeated, the tribes/sub-tribes may change and/or the membership of a given tribe/sub-tribe may vary, e.g. over time or with each application of the segmentation process, a given user may be added to and/or removed from one or more tribes/sub-tribes, new tribes/sub-tribes may be created, tribes/sub-tribes may be merged or further divided, etc., as new data is received and/or previously acquired data is modified. As the tribes/sub-tribes are defined by the demographic commonalties of the target users, as opposed to being pre-define by the sponsor or operator of the disclosed embodiments, bias may be minimized.

Generally, the assignment of each user to a tribe/sub-tribe permits the system to make an inference of what other brands/services/activities/experiences (paid or unpaid) a member of a tribe/sub-tribe (whose attributes include particular brands/brand affinities) are likely to feel the same about as the tribe-associated brands. That is, if one is categorized into a particular tribe/subtribe because they feel a certain way about certain brands, then they will feel that way about another service/activity/experience the vendor wishes to provide.

Social Media Extracted Segmentation ("SMES") is a process by which the disclosed embodiments identify and assign one or more affinities to each tribe/sub-tribe. The collection of assigned affinities for a given tribe or sub-tribe may be referred to as an affinity fingerprint and will typically, but not necessarily, be unique to give tribe/sub-tribe. The SMES process is based on an assumption that a person may display behavioral trends or otherwise express feeling for particular brand or entities via their engagement therewith in social media. As such then, the resultant affinity fingerprint will represent the socio-behavioral components of that engagement. SMES derives one's brand loyalty/affinity based on how that brand makes them feel and is a different modality than the concept which underlies collaborative/content-based filtering that associates activity related to one product (search or purchase) with likely activity related to a second product. The resulting affinity fingerprint is then based on both semantic/textual descriptions and a propensity assessment of the user(s) from which the data is derived.

The SMES process utilizes social media data, e.g. follows, likes, hashtags and associated content, tags and associated content, posts, tweets, comments, etc., of a population of users which utilizes various forms of electronic communication, such as websites for social networking and microblogging, through which users create online communities to share information, ideas, personal messages, and other content (such as videos). Such data may be obtained from, for example, Facebook®, Twitter®, Tumblr®, Instagram®, Reddit®, Yelp®, blogs, online forums, commercial vendor review/comment sections, etc.

In one embodiment, anonymized aggregated/bulk historical social media data is obtained from a third party source, such as Infegy, Inc. or other service which conducts social media listening to create and maintain a historical database of social media interactions and performs analytics based thereon, and includes, for example, data related to audience interests, topics, themes, and/or sentiments associated with various brands, events, and/or celebrities. It will be appreciated that non-anonymized and/or collection of non-aggregate social media data may also be used. Furthermore, social media data, bulk/aggregate or otherwise, obtained in real time may be used in place of, or in conjunction with, bulk historical data. In one embodiment, the population of users for which the social media data is collected is a generalized population of users, defined separate from the target set of users, meeting some broad/general criteria, such as users with some social media activity related to one or more of a set of predefined commercial brands, such as the brands offered by the vendor, and/or competitors or related entities thereto, deploying the disclosed embodiments. The social media data may further include metric data relating to, for example, influence, such as influencer scores, or other weighting data, such as the number of different brands a user may engage with, which may be used to assess the significance of one subset of the social media data vs another subset or against a metric of significance. While any of the target set of users may be included in the generalized population of users by virtue of meeting the requirements therefore, in one embodiment, the generalized population of users is an independently defined group.

In particular, the generalized population for which social media data will be obtained may be determined by first identifying/curating a relevant set of commercial brands/ entities, such as vendor related brands/entities, luxury brands/entities, travel related brands/entities, outdoor products/services related brands/entities, etc. A relevant set of brands/entities may be identified, in one embodiment, by looking what other brands/entities appear in the social media data/activities of those social media users who also mention, but not necessarily purchased, the brand of the vendor operating or otherwise engaging/employing the disclosed embodiments, or who mention a brand identified a preferred by one or more of the target users. The generalized population for which social media data will be analyzed, as described below, may then comprise the subset of all social media users which have some social media activity related to at least one of the predefined brands.

Once the generalized population has been identified, their social media activity is analyzed to identify their engagement, via textual representations of subjects and items, with each of the predefined brands, e.g. what words/phrases were used in conjunction with the presence/mention of the brand, what other brands were mentioned in association, was the brand "liked" or "followed" and what other brands were also "liked" or "followed" by that same user. For each predefined brand, the engagement activity is used to build a description of the brand, e.g. a set of descriptive words/phrases that describe how a user "feels" about the brand. These brand descriptions, also referred to as brand affinity fingerprints, may be independent of any demographic attributes or affinities of the users from which social media is derived.

SMES further alleviates the "cold start" problem, which may inhibit other types of recommender systems, and can be used to produce, e.g. extrapolate, "from scratch" recommendations for a user when there is minimal historical data available for that user from which recommendations may otherwise be derived using content-based or collaborative filtering. SMES may be used to completely eliminate reliance on historical data or be combined with content-based and/or collaborative filtering once sufficient historical data is amassed to support these additional mechanisms, i.e. SMES may be used to bootstrap content- or collaborative-based systems.

The brand affinity fingerprints may also be created and/or further supplemented with narratives and/or additional collections of descriptive words or phrases developed via a creative writing process employed by the operator of, and/or vendor deploying, the recommender system.

It will be appreciated that brand affinity fingerprints may be created or supplemented via other processes, such as based on traditional marketing data, e.g. survey responses, customer feedback, behavioral observations, etc. For example, such marketing data may be obtained based on previously provided recommendations, thereby forming a feedback loop which adapts the disclosed recommender system based on prior activity, e.g. whether prior recommendations were accepted or rejected, whether non-recommended alternatives were chosen over a recommendation, etc.

The brand descriptions, also referred to as brand "affinity fingerprints" are then processed through a Natural Language Processing ("NLP") system. As will be described below, this same, or a similar, Natural Language Processing system may further be used to create activity fingerprints. NLP is used to expand upon the concepts, words and phrases found the identified social media engagement, i.e. to expand on the identified words/phrases were used in conjunction with the presence/mention of a pre-defined brand, what other brands were mentioned in association, was the brand "liked" or "followed" and what other brands were also "liked" or "followed" by that same user, etc. By using NLP to expand the identified social media engagement, a more robust affinity fingerprint is derived which can account to differences in the way similar feelings and concepts are expressed by different people in ordinary discourse thereby by improving the accuracy of the fingerprint as capturing a particular affinity.

Generally, brand affinity fingerprints are first processed to remove stop words, e.g. words which are insignificant to the process such as articles ("a", "the"), pronouns, short function words, etc. The brand affinity fingerprints are then tokenized, i.e. lexically processed, whereby sequences of letters or words are grouped into strings or phrases to which an identified meaning may be ascribed. Tokenization is the act of breaking up a sequence of strings into pieces such as words, keywords, phrases, symbols and other elements called tokens. Tokens can be individual words, phrases or even whole sentences. In the process of tokenization, some characters like punctuation marks may be discarded. In addition, topics and keywords may be extracted from a series of one or more tokens using a Latent Dirichlet allocation ("LDA") model which is a generative probabilistic model of a collection of composites made up of parts. LDA is a method of soft clustering and creating fuzzy memberships and may be used to uncover or otherwise infer themes in a data set, e.g. wherein the presence of particular words may be attributed to particular topics.

Finally, synonym expansion is applied to the brand affinity fingerprints whereby synonyms to the words, phrases and concepts within brand affinity fingerprint are identified and added to the brand affinity fingerprint. In one embodiment, synonym expansion is applied multiple times, e.g. twice, via subsequent application of synonym expansion to previously processed brand affinity fingerprints. The fully processed brand affinity fingerprints are then stored in a data structure in a database and/or memory, e.g. as an array, to facilitate comparison as will be described.

The functions of stop word removal, tokenization and synonym expansion may be provided by a natural language toolkit ("NLTK") which is a suite of computer program code libraries and programs for symbolic and statistical natural language processing developed by Steven Bird and Edward Loper at the University of Pennsylvania.

Figure 4:
FIG. 4 shows a diagram of an exemplary brand affinity fingerprint, according to one embodiment, for use with the system of FIG. 1.

Once the brand affinity fingerprints are generated, one or more may be assigned to one or more of the tribes/sub-tribes. The assignment of a given brand affinity fingerprint to a tribe/sub-tribe may be based on some commonality between the contents of the brand affinity fingerprint and one or more of attributes defining the tribe/sub-tribe, such as a common brand or entity. It will be appreciate that brand affinity fingerprints and/or their assignment to one or more tribes/sub-tribes may be subsequently modified, e.g. continuously updated as the underlying data, such as the social media extracted data, tribe/sub-tribe membership and/or organization, etc. changes. An exemplary brand affinity fingerprint is shown in FIG. 4 where the size of the elements is indicative of a weighting thereof.

In additional recommendation affinity fingerprints are created for each recommendation in the set of recommendations from which one or more will be chosen to be provided to one or more target users as described. In the case of a recommendation affinity fingerprint, the process may begin with a narrative description prepared via a creative writing process. The narrative description is then processed via NLP, in a manner similar to that described above, to remove stop words, tokenize the content and perform one or more iterations of synonym expansion which results in the recommendation affinity fingerprint for the particular recommendation.

It will be appreciated that both brand affinity and recommendation fingerprints may further be updated, e.g. periodically, based on business rules, e.g. to update terminology and "lingo" to comport with usage in the industry, culture, etc., and to maintain relevancy and flexibility.

With the brand affinity fingerprints and recommendation fingerprints created and stored, each recommendation fingerprint is assessed against each brand affinity fingerprint to assess a degree of commonality, e.g. a degree to which the elements thereof overlap or otherwise to determine a metric of words or phrases they have in common, e.g. a count of the number of words or phrases in common. This assessment may result in a score value referred to as an "affinity score." In one embodiment, the recommendations associated with reach recommendation fingerprint are rank ordered based on their affinity score for each brand affinity fingerprint and this rank ordered list is then provided as recommendations to the members of the tribe/sub-tribe associated with the brand affinity finger print. In an alternative embodiment, only a subset of the rank ordered list, e.g. the top 5, are provided. In another alternative embodiment, only those recommendations associated with affinity scores which exceed a threshold value are provided. Where a tribe/sub-tribe is associated with more than one brand affinity fingerprint, the recommendations associated with assessment against each of the associated brand affinity fingerprints may be combined for provision to the members of the tribe/sub-tribe. In this manner, each tribe/sub-tribe may receive a unique set of recommendations uniquely tailored to the affinities of the members thereof.

As was discussed above, the above process can be combined with collaborative and/or content based filtering techniques to further refine or supplement the recommendations. In addition, the determined recommendations may be subject to further filtering to refine their relevance, such as by using geographic proximity and/or temporal attributes. For example, where a recommendation relates to a specific geographic location, e.g. the spa or the bar on board a ship, recommendations related thereto may only be provided when the target user is proximate to, or moving in the direction of, that location. Further, on-board activities may only be recommended when the target user is aboard the ship and excluded if the target user is not on board, e.g. on an excursion. Similarly, when recommendations relate to specific times, such as a dinner or spa reservation, recommendations related thereto may only be provided at or near the specific time or at relevant period related thereto. Further, time-specific recommendations may only be provided when the target user and/or the recommended service or activity are available, e.g. a spa treatment may only be recommended when there are available spa appointments and/or the target user is available.

While the above disclosed process avoids monetization bias, e.g. recommendations which result in revenue for the vendor, and/or sponsor bias, e.g. providing recommendations relating products or services from a particular source, it will be appreciated that subsequent processing may be applied to provide such bias where warranted or desired. For example, the determined recommendations may be further filtered or processed to promote particular recommendations, such as those which maximize vendor revenue, and/or those which recommend products and/or service from a particular source or which may be underutilized. Such recommendations may be elevated or highlighted on the rank ordered list provided to target users or recommendations which do not meet the designated criteria may be excluded altogether.

Herein, the phrase "coupled with" is defined to mean directly connected to or indirectly connected through one or more wired and/or wirelessly connected intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions hereinbefore or hereinafter unless expressly asserted by the Applicant to the contrary, to mean one or more elements selected from the group including A, B, . . . and N, that is to say, any combination of one or more of the elements A, B, . . . or N including any one element alone or in combination with one or more of the other elements which may also include, in combination, additional elements not listed.

FIG. 1 depicts a block diagram of a system 100, e.g. a recommendation system, according to one embodiment, for electronically providing, directly or indirectly, recommendations, e.g. for products, activities, experiences, adjunct services, etc., to target set of users with improved accuracy, e.g. that the recommendation will be acted upon by the recipient or otherwise viewed as beneficial or otherwise improve a probability that the recommendation will be accepted by the recipient.

The system 100 may be implemented as a separate component or as one or more logic components, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3. In one embodiment, the system 100 is implemented by a server computer, e.g. a web server, coupled with one or more client devices 106, such as computers, mobile devices, etc. via a wired and/or wireless electronic communications network 108, such as the wide area network 108, local area network 108, and/or radio 108, in a network environment 108 or the network 320 described below with respect to FIG. 3. In one embodiment, client devices 106 interact with the system 100 of the server computer via the network 108 to provide inputs thereto and/or receive outputs therefrom as described herein. The system 100 may also be implemented with one or more mainframe, desktop or other computers, such as the computer 300 described below with respect to FIG. 3. In one embodiment, client devices 106B are used by the operator(s) of the system 100 to interact therewith to cause the system to generate recommendations and/or to provide other necessary data or control inputs to the system as will be described. Client devices 106B may be operated the target users and/or intermediary agents of the operator of the system 100 and received recommendations generated by the system 100 for direct consumption or for delivery to a target user, as described herein. Client devices 106B may further include other devices for the delivery of recommendations, including electronic signage and/or a public address system, etc.

Figure 3:
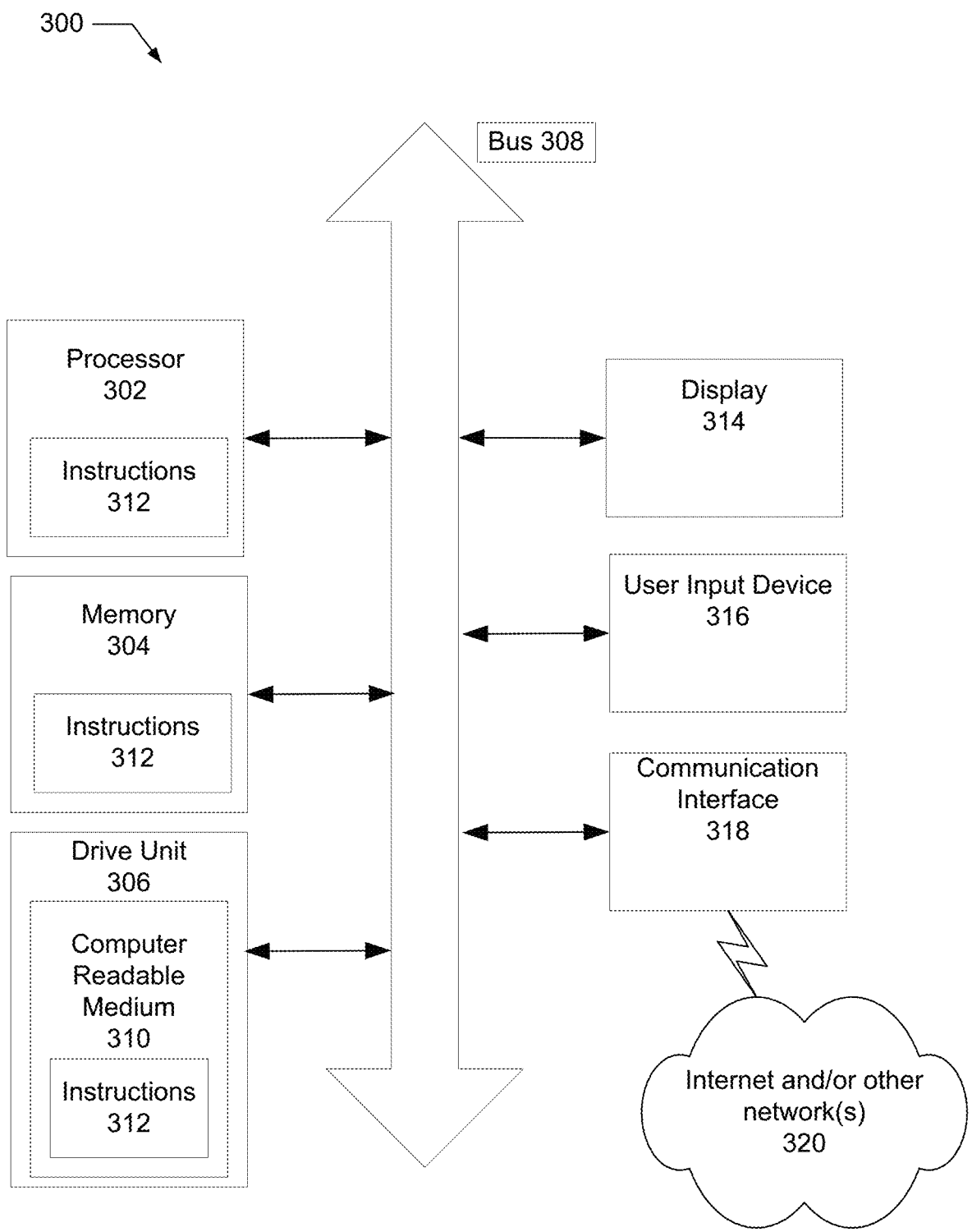
FIG. 3 shows an illustrative embodiment of a general computer system which may be used to implement one or more components of the system of FIG. 1.

The system 100 includes a demographic data retriever 110 which may be implemented as a separate component or as one or more logic components, e.g. first logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, obtain, for each target user of a set of target users, one or more demographic data items, from a demographic database 112 coupled with the processor 104, such as via the network 108, each of the one or more demographic data items comprising data indicative of specific values of one or more statistical characteristics descriptive of the target user, such as data indicative of one or more of age, gender, marital status, home address, occupation, brand associations/preferences, or combinations thereof. In one embodiment, the target users have identified themselves to the system 100.

The system 100 further includes a segmentation processor 114 coupled with at least the demographic data retriever 110 and which may be implemented as a separate component or as one or more logic components, e.g. second logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, define a set of demographic categories, e.g. tribes or sub-tribes, each defined based on a pre-defined, as described above, unique combination of one of more of the one or more statistical characteristics, values and/or value ranges thereof, and subsequent thereto, assign each target user of the set of target users to one or more of the demographic categories of the set of demographic categories based on the specific values of the one or more statistical characteristics descriptive thereof, wherein target users having similar values of the one or more statistical characteristics are assigned to the same common demographic categories/

The demographic data retriever 110 and segmentation processor 114 are further operative to store, in the memory 102, e.g. in a data structure or database 130, data indicative of each of the set of demographic categories and the target users assigned thereto.

The system 100 further includes a social media extraction processor 116 which may be implemented as a separate component or as one or more logic components, e.g. third logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, identify a representative population of users, which may be the same or overlap with the set of target users, and for each user in the representative population, obtain descriptive data, from a social media database 118 coupled with the processor 104, such as via the network 108, indicative of the user's engagement, e.g. descriptive words, posts, tweets, comments, follows, likes, etc., with one or more of a target set of brands of goods and/or services. The target set of brands may be defined in advance based on relevance to the service, e.g. based on the brand preferences of the set of target users or defined by any engaged-with brand.

In one embodiment, the representative population may be identified based on users who have expressed interest in the service for which the recommendations are being generated, e.g. via registration, survey response, prior purchase, etc. In one embodiment, the target set of brands includes any brand engaged with by the representative population.

In one embodiment, the social media extraction processor/third logic 116 may be further executable by the processor 104 to cause the processor 104 to, prior to identification of the representative population and obtaining of the engagement data, define the set of target brands of goods and/or services based on relevance to the recommendations, or service/product for which the recommendations are being generated.

In one embodiment, the social media database 118 comprises historical data, data obtained in real time, or a combination thereof.

In one embodiment, each element of the set of one or more words and/or phrases present in the identified descriptive data indicative of each user of the population's engagement with the target brand may be further associated with a weight value determined based on the particular user's influence, number of different brands engaged with, or a combination thereof.

The system 100 further includes a brand affinity fingerprint generator 120 coupled with at least the social media extraction processor 116 and which may be implemented as a separate component or as one or more logic components, e.g. fourth logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, compile, for each target brand of the set of target brands, a set of one or more words and/or phrases present in the identified descriptive data indicative of each user of the population's engagement with the target brand. The compilation may be referred to as a brand affinity fingerprint.

In one embodiment, the brand affinity fingerprint generator/fourth logic 120 may be further executable by the processor 104 to cause the processor 104 to expand the set of one or more words and/or phrases present in the identified descriptive data indicative of each user of the population's engagement with the target brand by identifying, and adding thereto, one or more synonyms of each of the set of one or more words and/or phrases, e.g. via one or more applications of NLTK synonym generation, using creative writing, or combinations thereof.

The system 100 further includes a segment affinity processor 122 coupled with at least the brand affinity fingerprint generator 120 and which may be implemented as a separate component or as one or more logic components, e.g. fifth logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, assign each compiled set of one or more words and/or phrases to, and store data indicative thereof in association with, one or more of the demographic categories stored in the memory based on a relationship between one or more of the defining statistical characteristics thereof and the target brand of the compiled set of one or more words and/or phrases. For example where the target brand is the same as a preferred brand associated with a demographic category, where the target brand is liked by a social media user who also likes a preferred brand, where the target brand is liked by social media user who is characterized by similar statistical characteristics as the demographic category, or combinations thereof.

The system 100 further includes a recommendation fingerprint generator 124 coupled with at least the segment affinity processor 122 and which may be implemented as a separate component or as one or more logic components, e.g. sixth logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, define a set of recommendation objects, e.g. for products, activities, experiences, adjunct services directly or indirectly provided by a "service" to a target set of users, each associated with a recommendation (message, offer, etc.) and characterized by a description comprising a set of descriptive words and/or phrases, also referred to as a recommendation affinity fingerprint, and store, in the memory 102, such as in a data structure or database 132, data indicative of the recommendation in association with data indicative of the set of words and/or phrases characteristic thereof.

In one embodiment, the recommendation fingerprint generator/sixth logic 124 may be further executable by the processor 104 to cause the processor 104 to process each recommendation description to remove irrelevant content, e.g. stop words, identify, e.g. via tokenization and/or LDA, linguistic units topics or themes, and identifying, and adding thereto, one or more synonyms of each of the set of descriptive words and/or phrases of the recommendation description, e.g. using NLTK synonym expansion.

The system 100 further includes a recommendation assessment processor 126 coupled with at least the recommendation fingerprint generator 124 and which may be implemented as a separate component or as one or more logic components, e.g. seventh logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, determine a degree of overlap of the stored set of descriptive words and/or phrases (recommendation affinity fingerprint) of each recommendation with each of the stored compiled sets of words and/or phrases (brand affinity fingerprint).

The system 100 further includes a recommendation generator 128 coupled with at least the recommendation assessment processor 126 and which may be implemented as a separate component or as one or more logic components, e.g. eighth logic, such as on an FPGA that may include a memory 102 or reconfigurable component to store logic and a processing component to execute the stored logic, or as computer program logic, stored in the memory 102, or other non-transitory computer readable medium, and executable by a processor 104, such as a specifically configured processor or the processor 302 and memory 304 described below with respect to FIG. 3, to cause the processor 104 to, or otherwise be operative to, cause, for each stored set of descriptive words and/or phrases which overlap at least one of the stored compiled sets of words and/or phrases by a threshold amount, the recommendation associated therewith, i.e. with the associated recommendation object, to be provided to each of the target users assigned in the memory 102 to the demographic categories to which the at least one of the stored compiled sets of words and/or phrases is also assigned.

Figure 2:
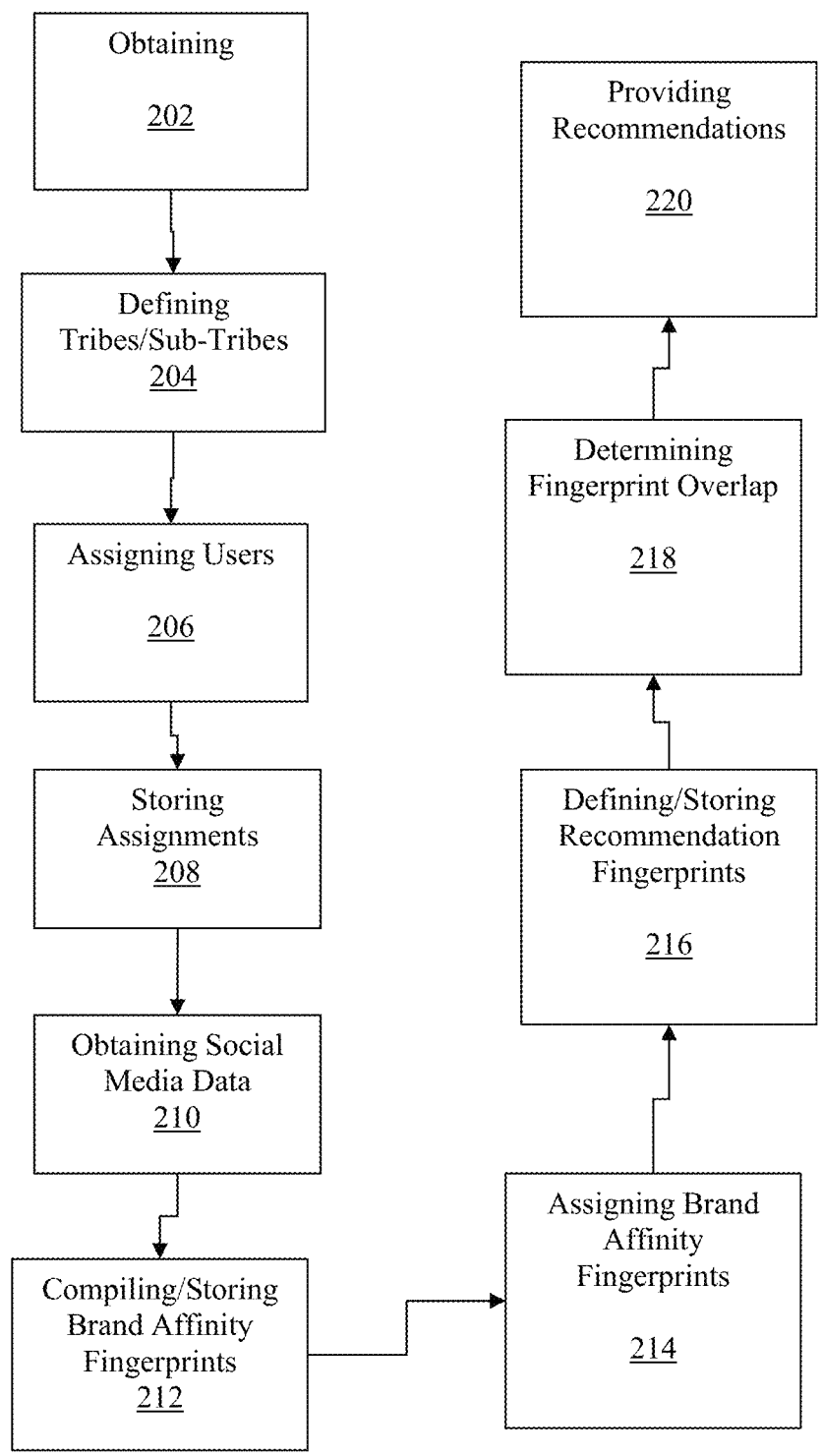
FIG. 2 depicts a flow chart showing operation of the system of FIG. 1.

FIG. 2 depicts a flowchart 200 showing the operation of the system 100 of FIG. 1 according to one embodiment for improving accuracy of computer-based recommendations as described above. The operation of the system 100 includes: obtaining, by a processor 104 of a computer-based recommendation system 100 for each target user of a set of target users, e.g. self-identified or otherwise, one or more demographic data items, from a demographic database coupled with the processor 104, such as via the network 108, each of the one or more demographic data items comprising data indicative of specific values of one or more statistical characteristics descriptive of the target user, e.g. one or more of age, gender, marital status, home address, occupation, brand preferences, or combinations thereof (Block 202).

The operation of the system 100 further includes defining, by the processor 104, a set of demographic categories, e.g. tribes and/or sub-tribes, each defined based on a, as described above, pre-defined and unique combination of one of more of the one or more statistical characteristics, values or value ranges thereof (Block 204), and, subsequent thereto, assigning each target user of the set of target users to one or more of the demographic categories of the set of demographic categories based on the specific values of the one or more statistical characteristics descriptive thereof, wherein target users having similar values of the one or more statistical characteristics are assigned to the same common demographic categories (Block 206).

The operation of the system 100 further includes storing, in a memory 102 coupled with the processor 104, data indicative of each of the set of demographic categories and the target users assigned thereto (Block 208).

The operation of the system 100 further includes identifying, by the processor 104, a representative population of users, which may be the same or overlap with the set of target users, and for each user in the representative population, obtaining descriptive data, from a social media database coupled with the processor 104, such as via the network 108, indicative of the user's engagement, e.g. descriptive words, posts, tweets, comments, follows, likes, etc., with one or more of a target set of brands of goods and/or services, which may be defined in advance based on relevance to the service, e.g. based on the brand preferences of the set of target users or defined by any engaged with brand (Block 210).

The operation of the system 100 further includes compiling, by the processor 104 or each target brand of the set of target brands, a set of one or more words and/or phrases present in the identified descriptive data indicative of each user of the population's engagement with the target brand, e.g. a brand affinity fingerprint, and storing the compiled set of one or more words and/or phrases in a portion of a first data structure 130 in the memory 102 (Block 212).

The operation of the system 100 further includes assigning, by the processor 104, the portion of the first data structure which stores each compiled set of one or more words and/or phrases to, and storing data indicative thereof in association with, one or more of the demographic categories stored in the memory based on a relationship between one or more of the defining statistical characteristics thereof and the target brand of the compiled set of one or more words and/or phrases (Block 214).

The operation of the system 100 further includes defining, by the processor 104, a set of recommendation objects, e.g. for products, activities, experiences, adjunct services; directly or indirectly provided by a "service" to a target set of users, each associated with a recommendations and characterized by a description comprising a set of descriptive words and/or phrases, e.g. a recommendation fingerprint, and storing, in a portion of a second data structure 132 in the memory 102, data indicative of the recommendation in association with data indicative of the set of words and/or phrases characteristic thereof (Block 216).

The operation of the system 100 further includes determining, by the processor 104, a degree of overlap of the stored set of descriptive words and/or phrases of each recommendation with each of the stored compiled sets of words and/or phrases by comparing the associated portions of the first data structure with the associated portions of the second data structure (Block 218).

The operation of the system 100 further includes causing, by the processor 104 for each stored set of descriptive words and/or phrases which overlap at least one of the stored compiled sets of words and/or phrases by a threshold amount, the recommendation associated therewith, i.e. with the associated recommendation object, to be provided to each of the target users assigned in the memory to the demographic categories to which the at least one of the stored compiled sets of words and/or phrases is also assigned (Block 220).

Referring to FIG. 3, an illustrative embodiment of a general computer system 300 is shown. The computer system 300 can include a set of instructions that can be executed to cause the computer system 300 to perform any one or more of the methods or computer based functions disclosed herein. The computer system 300 may operate as a standalone device or may be connected, e.g., using an electronic communications network, to other computer systems or peripheral devices. Any of the components or modules discussed above, such as the processors 110, 114, 116, 120, 122, 124, 126, 128, may be a computer system 300 or a component in the computer system 300. The computer system 300 may implement the computer implemented system 100 of FIG. 1.

In a networked deployment, the computer system 300 may operate in the capacity of a server or as a client user computer in a client-server user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection or cluster of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. The processor 302 may be a component in a variety of systems. For example, the processor 302 may be part of a standard personal computer or a workstation. The processor 302 may be one or more general processors, specifically configured processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The computer system 300 may include a memory 304 that can communicate via a bus 308. The memory 304 may be a main memory, a static memory, or a dynamic memory. The memory 304 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 304 includes a cache or random access memory for the processor 302. In alternative embodiments, the memory 304 is separate from the processor 302, such as a cache memory of a processor, the system memory, or other memory. The memory 304 may be an external storage device or database for storing data. Examples include a hard drive, solid state drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the programmed processor 302 executing the instructions 312 stored in the memory 304. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 300 may further include a display unit 314, such as a liquid crystal display (LCD), an organic light emitting diode (OLED), a flat panel display, a solid state display, a cathode ray tube (CRT), a projector, a printer or other now known or later developed display device for outputting determined information. The display 314 may act as an interface for the user to see the functioning of the processor 302, or specifically as an interface with the software stored in the memory 304 or in the drive unit 306.

Additionally, the computer system 300 may include an input device 316 configured to allow a user to interact with any of the components of system 300. The input device 316 may be a number pad, a keyboard, or a cursor control device, such as a mouse, or a joystick, touch screen display, remote control or any other device operative to interact with the system 300.

In a particular embodiment, as depicted in FIG. 3, the computer system 300 may also include a disk or optical drive unit 306. The disk drive unit 306 may include a computer-readable medium 310 in which one or more sets of instructions 312, e.g. software, can be embedded. Further, the instructions 312 may embody one or more of the methods or logic as described herein. In a particular embodiment, the instructions 312 may reside completely, or at least partially, within the memory 304 and/or within the processor 302 during execution by the computer system 300. The memory 304 and the processor 302 also may include computer-readable media as discussed above.

The present disclosure contemplates a non-transitory computer-readable medium that includes instructions 312 or receives and executes instructions 312 responsive to a propagated signal, so that a device connected to a network 320 can communicate voice, video, audio, images or any other data over the network 320. Further, the instructions 312 may be transmitted or received over the network 320 via a communication interface 318. The communication interface 318 may be a part of the processor 302 or may be a separate component. The communication interface 318 may be created in software or may be a physical connection in hardware. The communication interface 318 is configured to connect with a network 320, external media, the display 314, or any other components in system 300, or combinations thereof. The connection with the network 320 may be a physical connection, such as a wired Ethernet connection or may be established wirelessly as discussed below. Likewise, the additional connections with other components of the system 300 may be physical connections or may be established wirelessly.

The network 320 may include wired networks, wireless networks, or combinations thereof. The wireless network may be a cellular telephone network, an 802.11, 802.16, 802.20, or WiMax network. Further, the network 320 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by an electronic communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., an electronic communication network. Examples of electronic communication networks include a local area network ("LAN") and a wide area network ("WAN"), e.g., the Internet.

The computing system can include clients and servers. A client and server are generally remote from each other and typically interact through an electronic communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for providing computer-based recommendations with improved accuracy, the method comprising:
    obtaining, by a processor of a computer-based recommendation system for each target user of a set of target users, one or more demographic data items, from a demographic database coupled with the processor, each of the one or more demographic data items comprising data indicative of specific values of one or more statistical characteristics descriptive of the target user;
    defining, by the processor, a set of demographic categories, each defined based on a unique combination of one of more of the one or more statistical characteristics, and assigning, automatically by the processor, each target user of the set of target users to one or more of the demographic categories of the set of demographic categories based on the specific values of the one or more statistical characteristics descriptive thereof, wherein target users having similar values of the one or more statistical characteristics are assigned to the same common demographic categories;
    storing, in a memory coupled with the processor, data indicative of each of the set of demographic categories and the target users assigned thereto;
    identifying, by the processor using a social media extracted segmentation process, a representative population of users and for each user in the representative population, obtaining, by the processor, descriptive data, from a social media database coupled with the processor, indicative of the user's engagement with one or more of a target set of brands of goods and/or services;
    compiling, by the processor for each target brand of the set of target brands, a brand affinity fingerprint comprising a set of one or more words and/or phrases present in the identified descriptive data indicative of each user of the population's engagement with the target brand, expanding, automatically by the processor using natural language processing, the set of one or more words and/or phrases present in the identified descriptive data indicative of each user of the population's engagement with the target brand by identifying, and adding thereto, one or more synonyms of each of the set of one or more words and/or phrases, and storing the expanded compiled set of one or more words and/or phrases in a portion of a first data structure in the memory, the brand affinity fingerprints enabling the provision of recommendations by the processor with a minimal historical dataset;
    assigning, by the processor, the portion of the first data structure which stores each compiled set of one or more words and/or phrases to, and storing data indicative thereof in association with, one or more of the demographic categories stored in the memory based on a relationship between one or more of the defining statistical characteristics thereof and the target brand of the compiled set of one or more words and/or phrases;
    defining, by the processor, a set of recommendation objects, each associated with a recommendation and characterized by a recommendation affinity fingerprint comprising a description which includes a set of descriptive words and/or phrases, and storing, in a portion of a second data structure in the memory, data indicative of the recommendation in association with data indicative of the set of words and/or phrases characteristic thereof;
    determining, by the processor, a score indicative of a degree of overlap of the stored set of descriptive words and/or phrases of each recommendation with each of the stored compiled sets of words and/or phrases by comparing the associated portions of the first data structure with the associated portions of the second data structure;
    causing, by the processor for each stored set of descriptive words and/or phrases with a score which exceeds a threshold amount, the recommendation associated therewith to be provided to each of the target users assigned in the memory to the demographic categories to which the at least one of the stored compiled sets of words and/or phrases is also assigned, the causing further comprising presenting the recommendation electronically on a display of at least one mobile device wirelessly coupled with the processor; and
    redefining, automatically by the processor, the set of demographic categories based on a result of the provided recommendation and reassigning one or more target users of the set of target users to a different one or more of the demographic categories of the set of demographic categories based on the specific values of the one or more statistical characteristics descriptive thereof and the result of the provided recommendation.

2. The computer implemented method of claim 1 wherein one or more of the target users of the set of target users have self-identified to the recommendation system.

3. The computer implemented method of claim 1 wherein the one or more statistical characteristics comprise one or more of age, gender, marital status, home address, occupation, brand preferences, or combinations thereof.

4. The computer implemented method of claim 1 wherein the representative population is identified based on users who have express interest in the service for which the recommendations are being generated.

5. The computer implemented method of claim 1 wherein the target set of brands includes any brand engaged with by the representative population.

6. The computer implemented method of claim 1 further comprising, prior to identifying the representative population and obtaining the engagement data, defining, by the processor, the set of target brands of goods and/or services based on relevance to the recommendations.

7. The computer implemented method of claim 1 wherein the social media database comprises historical data, data obtained in real time, or a combination thereof.

8. The computer implemented method of claim 1 wherein each element of the set of one or more words and/or phrases present in the identified descriptive data indicative of each user of the population's engagement with the target brand may be further associated with a weight value determined based on the particular user's influence, number of different brands engaged with, or a combination thereof.

9. The computer implemented method of claim 1 further comprising expanding the set of descriptive words and/or phrases of each recommendation affinity fingerprint by identifying, and adding thereto, one or more synonyms of each of the set of one or more words and/or phrases.

10. The computer implemented method of claim 1 further comprising processing each recommendation description to remove irrelevant content, identify linguistic units, topics or themes, and identifying, and adding thereto, one or more synonyms of each of the set of descriptive words and/or phrases of the recommendation description.

11. A system for providing recommendations with improved accuracy, the system comprising:
  first logic stored in a memory and executable by a processor coupled therewith to cause the processor to obtain, for each target user of a set of target users, one or more demographic data items, from a demographic database coupled with the processor, each of the one or more demographic data items comprising data indicative of specific values of one or more statistical characteristics descriptive of the target user;
  second logic stored in the memory and executable by the processor to cause the processor to define a set of demographic categories, each defined based on a unique combination of one of more of the one or more statistical characteristics, and automatically assign each target user of the set of target users to one or more of the demographic categories of the set of demographic categories based on the specific values of the one or more statistical characteristics descriptive thereof, wherein target users having similar values of the one or more statistical characteristics are assigned to the same common demographic categories;
  wherein the first and second logic are further executable by the processor to cause the processor to store, in the memory, data indicative of each of the set of demographic categories and the target users assigned thereto;
  third logic stored in the memory and executable by the processor to cause the processor to identify, using a social media extracted segmentation process, a representative population of users and for each user in the representative population, obtain descriptive data, from a social media database coupled with the processor, indicative of the user's engagement with one or more of a target set of brands of goods and/or services;
  fourth logic stored in the memory and executable by the processor to cause the processor to compile, for each target brand of the set of target brands, a brand affinity fingerprint comprising a set of one or more words and/or phrases present in the identified descriptive data indicative of each user of the population's engagement with the target brand, automatically expand, using natural language processing, the set of one or more words and/or phrases present in the identified descriptive data indicative of each user of the population's engagement with the target brand by identifying, and adding thereto, one or more synonyms of each of the set of one or more words and/or phrases, and store the expanded compiled set of one or more words and/or phrases in a portion of a first data structure in the memory, the brand affinity fingerprints enabling the provision of recommendations by the processor with a minimal historical dataset;
  fifth logic stored in the memory and executable by the processor to cause the processor to assign each stored compiled set of one or more words and/or phrases to, and store data indicative thereof in association with, one or more of the demographic categories stored in the memory based on a relationship between one or more of the defining statistical characteristics thereof and the target brand of the compiled set of one or more words and/or phrases;
  sixth logic stored in the memory and executable by the processor to cause the processor to define a set of recommendation objects, each associated with a recommendation and characterized by a recommendation affinity fingerprint comprising a description which includes a set of descriptive words and/or phrases, and store, in the memory, data indicative of the recommendation in association with data indicative of the set of words and/or phrases characteristic thereof;
  seventh logic stored in the memory and executable by the processor to cause the processor to determine a score indicative of a degree of overlap of the stored set of descriptive words and/or phrases of each recommendation with each of the stored compiled sets of words and/or phrases; and
  eighth logic stored in the memory and executable by the processor to cause the processor to cause, for each stored set of descriptive words and/or phrases with a score which exceeds a threshold amount, the recommendation associated therewith to be provided to each of the target users assigned in the memory to the demographic categories to which the at least one of the stored compiled sets of words and/or phrases is also assigned, the processor being further operative to cause the recommendation to be presented electronically on a display of at least one mobile device wirelessly coupled with the processor; and
  ninth logic stored in the memory and executable by the processor to cause the processor to automatically redefine the set of demographic categories based on a result of the provided recommendation and reassign one or more target users of the set of target users to a different one or more of the demographic categories of the set of demographic categories based on the specific values of the one or more statistical characteristics descriptive thereof and the result of the provided recommendation.

12. The system of claim 11 wherein one or more of the target users of the set of target users have self-identified.

13. The system of claim 11 wherein the one or more statistical characteristics comprise one or more of age, gender, marital status, home address, occupation, brand preferences, or combinations thereof.

14. The system of claim 11 wherein the representative population is identified based on users who have express interest in the service for which the recommendations are being generated.

15. The system of claim 11 wherein the target set of brands includes any brand engaged with by the representative population.

16. The system of claim 11 wherein the third logic is further executable by the processor to cause the processor to, prior to identification of the representative population and obtaining of the engagement data, define the set of target brands of goods and/or services based on relevance to the recommendations.

17. The system of claim 11 wherein the social media database comprises historical data, data obtained in real time, or a combination thereof.

18. The system of claim 11 wherein each element of the set of one or more words and/or phrases present in the identified descriptive data indicative of each user of the population's engagement with the target brand may be further associated with a weight value determined based on the particular user's influence, number of different brands engaged with, or a combination thereof.

19. The system of claim 11 wherein the fourth logic is further executable by the processor to cause the processor to expand the set of descriptive words and/or phrases of each recommendation affinity fingerprint by identifying, and adding thereto, one or more synonyms of each of the set of one or more words and/or phrases.

20. The system of claim 11 wherein the sixth logic is further executable by the processor to cause the processor to process each recommendation description to remove irrelevant content, identify linguistic units, topics or themes, and identifying, and adding thereto, one or more synonyms of each of the set of descriptive words and/or phrases of the recommendation description.

21. A system for providing computer-based recommendations with improved accuracy, the system comprising:
   means for obtaining, for each target user of a set of target users, one or more demographic data items, from a demographic database coupled with the processor, each of the one or more demographic data items comprising data indicative of specific values of one or more statistical characteristics descriptive of the target user;
   means for defining a set of demographic categories, each defined based on a unique combination of one of more of the one or more statistical characteristics, and automatically assigning each target user of the set of target users to one or more of the demographic categories of the set of demographic categories based on the specific values of the one or more statistical characteristics descriptive thereof, wherein target users having similar values of the one or more statistical characteristics are assigned to the same common demographic categories;
   means for storing, in a memory, data indicative of each of the set of demographic categories and the target users assigned thereto;
   means for identifying, using a social media extracted segmentation process, a representative population of users and for each user in the representative population, obtaining descriptive data, from a social media database coupled with the processor, indicative of the user's engagement with one or more of a target set of brands of goods and/or services;
   means for compiling, for each target brand of the set of target brands, a brand affinity fingerprint comprising a set of one or more words and/or phrases present in the identified descriptive data indicative of each user of the population's engagement with the target brand, expanding, automatically, using natural language processing, the set of one or more words and/or phrases present in the identified descriptive data indicative of each user of the population's engagement with the target brand by identifying, and adding thereto, one or more synonyms of each of the set of one or more words and/or phrases, and storing the expanded compiled set of one or more words and/or phrases in a portion of a first data structure in the memory, the brand affinity fingerprints enabling the provision of recommendations with a minimal historical dataset;
   means for assigning each compiled set of one or more words and/or phrases to, and storing data indicative thereof in association with, one or more of the demographic categories stored in the memory based on a relationship between one or more of the defining statistical characteristics thereof and the target brand of the compiled set of one or more words and/or phrases;
   means for defining a set of recommendation objects, each characterized by an associated recommendation and a recommendation affinity fingerprint comprising a description which includes a set of descriptive words and/or phrases, and storing, in the memory, data indicative of the recommendation in association with data indicative of the set of words and/or phrases characteristic thereof;
   means for determining a score indicative of a degree of overlap of the stored set of descriptive words and/or phrases of each recommendation with each of the stored compiled sets of words and/or phrases; and
   means for causing, for each stored set of descriptive words and/or phrases with a score which exceeds a threshold amount, the recommendation associated therewith to be provided to each of the target users assigned in the memory to the demographic categories to which the at least one of the stored compiled sets of words and/or phrases is also assigned, the means for causing further comprising means for presenting the recommendation electronically on a display of at least one mobile device; and
   means for redefining, automatically, the set of demographic categories based on a result of the provided recommendation and reassigning one or more target users of the set of target users to a different one or more of the demographic categories of the set of demographic categories based on the specific values of the one or more statistical characteristics descriptive thereof and the result of the provided recommendation.

22. The computer implemented method of claim 1, wherein each of the at least one mobile device is controlled by another person who, when prompted by the mobile device, presents the recommendation to at least one of the target users.

23. The computer implemented method of claim 1, wherein the causing further comprises determining a geographic proximity of the target user to a location at which a product or service, which is the subject of the recommendation, is provided and providing the recommendation to the target user when the target user is proximate to the location or en route thereto.

24. The system of claim 11, wherein each of the at least one mobile device is controlled by another person who, when prompted by the mobile device, presents the recommendation to at least one of the target users.

25. The system of claim 11, wherein the eighth logic is further executable by the processor to cause the processor to determine a geographic proximity of the target user to a location at which a product or service, which is the subject of the recommendation, is provided and provide the recommendation to the target user when the target user is proximate to the location or en route thereto.

* * * * *